US005182987A

United States Patent [19]

Viaud

[11] Patent Number: 5,182,987
[45] Date of Patent: Feb. 2, 1993

[54] ROUND BALER WITH TRACKING CONTROL FOR TRACTION MEANS USED TO MOVE CROP FOR BALING

[75] Inventor: Jean Viaud, Sarreguemines, France

[73] Assignee: Deere & Company, Moline, Ill.

[21] Appl. No.: 781,539

[22] Filed: Oct. 22, 1991

[30] Foreign Application Priority Data

Dec. 31, 1990 [DE] Fed. Rep. of Germany ....... 4042246

[51] Int. Cl.[5] ......................... B30B 5/06; A01D 39/00
[52] U.S. Cl. ...................................... 100/87; 56/341; 100/88; 100/99; 198/807; 474/103
[58] Field of Search .......................... 100/5, 87, 88, 99; 56/341; 198/806, 807; 474/102-104

[56] References Cited

U.S. PATENT DOCUMENTS

| | | | |
|---|---|---|---|
| 2,344,817 | 3/1944 | Hlavaty | 474/103 |
| 3,981,391 | 9/1976 | Phillips et al. | 56/341 X |
| 4,092,914 | 6/1978 | Burrough et al. | 100/88 |
| 4,224,867 | 9/1980 | Gaeddert et al. | 100/88 |
| 4,527,686 | 7/1985 | Satoh | 474/102 X |
| 4,686,820 | 8/1987 | Andra et al. | 100/88 X |
| 4,959,040 | 9/1990 | Gardner et al. | 474/103 |

Primary Examiner—Harvey C. Hornsby
Assistant Examiner—Stephen F. Gerrity

[57] ABSTRACT

The bale-forming belt for wrapping crop upon itself to form a cylindrical bale within a baling chamber of a round baler is automatically maintained in a straight tracking condition, despite an uneven supply of crop entering across the width of the baler, by a tracking control that is responsive to uneven tension across or the mistracking of the belt for effecting radial adjustment of one end of one or more of the rolls supporting the belt.

3 Claims, 1 Drawing Sheet

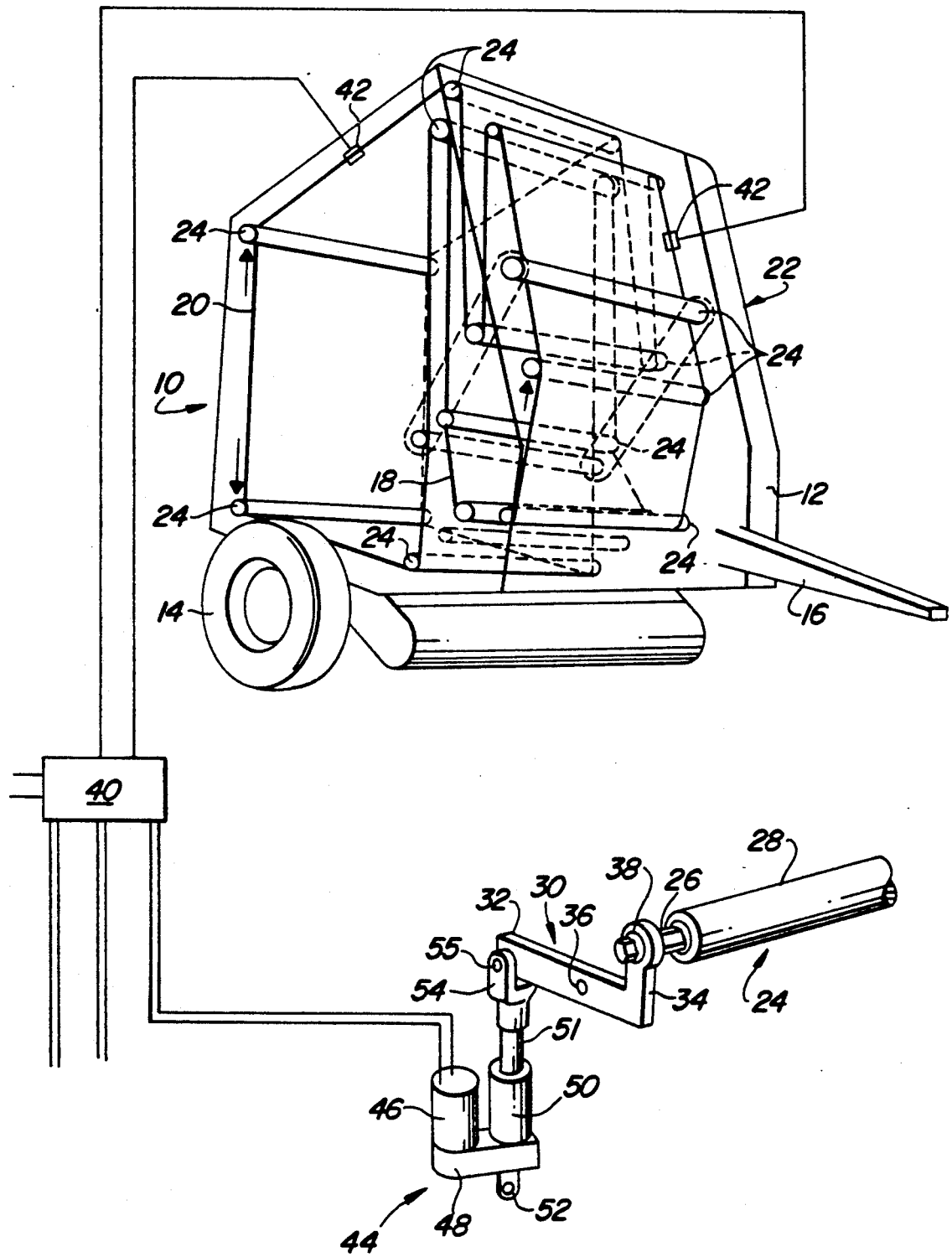

ROUND BALER WITH TRACKING CONTROL FOR TRACTION MEANS USED TO MOVE CROP FOR BALING

BACKGROUND OF THE INVENTION

This invention concerns a round baler with at least one traction means to move crop for baling or to or in a baling chamber and with rolls over which the traction means runs and more specifically concerns a tracking control for such traction means.

Round balers are used to take up crop to be baled and to wrap it on itself. Such round balers are frequently used in agriculture to collect straw or hay that is deposited in windrows on the ground. The outer shape of the bale depends upon the uniformity of supply of the crop to be baled. If the supply of the crop to be baled is not uniform, the traction means is loaded on one side, which sets the bale into rotation, so that in addition to the component of movement in the direction of operation of the traction means, a component perpendicular thereto is developed that permits the traction means to run at a slant. This slant running can lead to tearing of the traction means or, if several traction means are running in parallel on the roll, they may cross over one another.

It is known from U.S. Pat. No. 4,224,867, that the shape of a round bale can be monitored by sensors that detect the tension of the traction means configured as belts and provide the corresponding information to an operator as the distortion of the round bale by means of an optical or acoustic indicator. By modifying the loading, for example, the direction of driving, the operator can supply more crop to the side of the baler that is deficient in crop. However, following the signals of such sensors is not entirely satisfactory since it requires the constant attention of the operator.

In addition, it is known practice when using a multiplicity of belts alongside each other to provide guide vanes between the belts, which at the least prevent crossover between adjacent belts. However, the use of guide vanes is also not entirely satisfactory since it may lead to damage to the edges of the belts.

SUMMARY OF THE INVENTION

According to the present invention there is provided a tracking mechanism for the traction means of a round baler for causing the traction means to constantly track in a straight line motion without the use of guide vanes or without the supply to the baling chamber being adjusted constantly to the shape of the bale.

An object of the invention is to provide a tracking system for the traction means of a baler which operates to adjust the end position of one or more of the support rolls for maintaining an even tension in the conveying means so that it tracks straight.

A further object of the invention is to provide a tracking system for the traction means which permits the usage of a single traction means which spans the entire width of the baling chamber.

Yet another object of the invention is to provide a tracking system for round baler traction means, in the form of multiple belts, which eliminates the need for using guide vanes between the belts.

Still another object of the invention is to provide a tracking system which maintains straight tracking automatically.

These and other objects of the invention will become apparent from a reading of the ensuing description together with the appended drawing.

BRIEF DESCRIPTION OF THE DRAWING

The sole figure is a schematic right front perspective view of a round baler equipped with a traction means embodying a tracking control or regulating arrangement constructed in accordance with the present invention.

DESCRIPTION OF THE PREFERRED EMBODIMENT

According to the drawing a round baler 10 includes a main frame 12, supported by ground wheels 14 and having a drawbar 16 for coupling to a prime mover 16, not shown, such as an agricultural tractor.

The round baler 10 is used to take up and compact crop, which is usually deposited on the ground in windrows for drying. It can, however, be configured as any type of round baler that can compact silage, wool or other agricultural or industrial materials.

In its interior, the frame 12 contains a baling chamber 18 whose circumference is largely surrounded by a traction means 20 and whose end faces are enclosed by side walls 22.

The traction means 20, here shown as a belt, runs over a multiplicity of support rolls 24 that guide it in a path so as to form a loop in which the crop to be baled is rolled up between two oppositely moving spans of the traction means 20. Such a configuration of a round baler is adequately known and does not require any further description.

In contrast to known round balers, the traction means 20 of this embodiment covers the entire width of the baling chamber 18 and thus does not permit any small pieces of crop to escape from the baling chamber 18. The traction means 20 is preferably formed from a flexible rubberized belt having internal reinforcement and having an embossed surface.

The rolls 24 are arranged such that their axles 26 extend parallel to each other. The opposite ends of some of the rolls 24 are rotatably supported directly by the side walls 22 while others of the rolls 24 have their opposite ends supported in carriers (not shown) which are pivotally mounted to the side walls in a manner also adequately known. Each carrier can pivot against the force of a spring, so that it can vary the size of the loop defined by the rolls 24 supported by the carrier and therewith the size of the baling chamber 18 in response to the increasing diameter of the bale during the baling process.

The rolls 24 mounted in the side walls 22 as well as those mounted on the carrier, cannot be moved in their position from their attachments.

Some of the rolls 24, such as those marked with an arrow, are provided with a mounting as shown in the lower part of the drawing. For this purpose the axles 26 extend axially beyond the body 28 of the rolls 24.

The axle 26 of each adjustable roll 24 is mounted on an angle lever 30 having a first and a second leg 32 and 34, respectively, that extend at right angles to each other, the angle lever 30 acting to amplify the force of an adjustment actuator that is coupled thereto as described below.

To one side of the first leg 32 a bearing pin 36 extends that is supported, free to rotate, in a respective one of the side walls 22 or in one of the aforementioned carriers. In addition, a bore is provided in the first leg 32 that is used for a connection to an actuator to be described below.

In its free end region, the second leg 34 is also provided with an opening forming a part of a ball joint socket in which is received a ball element 38 in which the free end of a respective one of the axles 26 is fixedly received. As can be seen, the angle lever 30 is pivotable about the bearing pin 36 and thereby displaces the axle 26 radially and with it the roll 24. The ball joint, defined by the socket and ball element 38, makes it possible for the axle 26 to take on an inclined position with respect to the legs 32, 34 without inducing any stresses.

In order to effect an adjustment of the angle lever 30, a tracking control or regulating arrangement 40 is provided, whose input is connected to several sensors 42 and whose output side is connected to one or more actuators 44.

The control or regulating arrangement 40 preferably contains a programmable small computer, in which boundary values, time delay values or other parameters are stored for use in the adjustment of a respective one of the rolls 24. Whether the result intended by the adjustment of the roll 24 is monitored or not, a control or regulating arrangement is needed. The control or regulating arrangement 40 is supplied with energy by an electric circuit and may be in constant operation or switched on and off by an operator. For the input and output of signals the control or regulating arrangement 40 is permanently connected by electrical lines with the sensor 42 and each actuator 44.

In this embodiment there are several sensors 42 that may be arranged at almost any desired location and may operate according to various principles; the one thing the various configurations have in common is their ability to recognize a condition in the traction means 20 that could be capable of causing a motion in the belt perpendicular to the normal running direction. This condition can be detected by means of a sensor that reacts to the tension in the traction means 20, i.e., if it experiences more or less tension in a particular region. For this purpose a sensor 42 with a contact plate may be employed that interrupts or opens a flow of current as soon as it is moved by the traction means 20 if it should deviate towards one side. In another case, the sensor 42 may contain a sensor actuator that emits a beam of light or sound that are either blocked by or bypass the traction means 20 and whose reception is monitored by a receiver. In the preferred embodiment, two sensors 42 are provided that are configured as linear potentiometers located at opposite side edges of the traction means 20. One of the sensor 42 monitors the running of the traction means 20 in the span between the baling chamber 18 and the drawbar 16, while the other sensor 42 monitors the running of the span between the baling chamber 18 and the rear end of the round baler 10. Here the movement of the span of the traction means 20 is monitored in the part that is not loaded directly by the bale, since generally this part moves to the side, while the part of the span loaded by the bale is forced too strongly against the rolls 24.

Each actuator 44 is preferably configured as a device that can be adjusted linearly either electrically, hydraulically or pneumatically. For one or both ends of the roll 24 that is desired be adjusted, an actuator 44 is required. In order to simplify the control of the controller regulating arrangement 40, an electric motor or an electromagnetic valve may be used. As disclosed herein, the actuator 44 consists of a reversible electric motor 46, a reduction gear set located within a housing 48 and coupled to a drive hub 50 that is in turn coupled for effecting extension or retraction of a rod 51 relative to the hub 50. In the preferred embodiment, the gear housing 48 is pivotally connected to the frame 12 or side walls 22 by means of a pivot pin 52 which permits pivotal movement of the actuator 44 during the pivoting of the angle lever 30. The actuator rod 51 has a fork 54 at its free end coupled, as by a pin 55, received in a bore in the first leg 32 of the lever 30 and is able to pivot the lever 30 about the bearing pin 36. Accordingly, a linear motion of the rod 51 of the actuator 44, in a first direction, results in the pivoting of the angle lever 30 about the bearing pin 36 and in the arcuate adjustment of the attached axle 26 of the associated roll 24 in a second direction generally opposite to said first direction.

In a simple configuration, an actuator 44 is provided on only one end of the roll 24, which can move the roll above and below a neutral position. According to another variation, an actuator 44 is provided on each end of the roll 24 for adjusting either end in one direction from a neutral position.

If an actuator 44 is provided which acts in only one direction, such as a one-way, extensible and retractable hydraulic or pneumatic motor, for example, then an external force such as a supplementary mechanical or gas spring may be provided to yieldably maintain the traction means in its neutral or collapsed position, in case the inherent tension in the traction means 20 is not adequate. Furthermore, the energy storage device provided will act to return the traction means to its corresponding neutral position after the release or deactivation of all actuators.

According to the foregoing, the operation is as follows.

In order to compact a bale from crop, the round baler 10 is driven by an agricultural tractor such that some of the rolls 24 are set in motion and cause the traction means 20 to be driven longitudinally. Following this, the round baler 10 is towed across a field and thereby takes up crop from the ground and conducts it to the baling chamber 18 where it is grasped by the traction means 20 and rolled upon itself. While the outside diameter of the bale steadily increases within the baling chamber 18, the tension in the traction means 20 increases. As long as the crop is supplied uniformly across the width of the baling chamber 18, the tension in the traction means 20 is substantially constant across the entire width of the baling chamber 18. As long as the rotational axes of the rolls 24 are oriented parallel to each other in their normal or neutral position, the traction means 20 also runs in a straight line motion.

If the supply of crop in the baling chamber 18 is not uniform, the traction means 20 is put under greater tension on its one side than on the other side. In its attempt to evade this higher tension, the traction means 20 tends to move across its normal running direction. The increased tension of the traction means 20 or its sideways movement is detected by the sensor 42 and transmitted to the control or regulating arrangement 40. According to a particular circuit or a particular algorithm, an output signal is generated there and transmitted to at least one of the actuators 44. Depending on the magnitude and the direction of the output signal transmitted, the motor 46 drives the hub 50 in one direction or the other, which in turn extends or retracts the rod 51 fork 54 thereby rotating the angle lever 30 to correspond. As a result of the pivoting of the angle lever 30, the attached end of the roll 24 is moved radially and takes on a position in which its rotational axis is no longer parallel to that of the other rolls 24. For example, the lever-attached end of the roll 24 may be moved radially away from the traction means 20 on the side on which the traction means 20 is subject to the highest tension. The same result can be obtained if the lever-atttached end of the roll is moved toward the side of the traction means 20 with the lower tension. In any case, the roll 24 is moved in such a way that the tension is equalized across the entire width of the traction means 20 so that no crosswise movement occurs. After the detection of a crosswise movement, a crosswise movement to the opposite side could be brought about by a corresponding adjustment of the roll 24 before a tension is built up in the traction means 20 that is not uniform.

If several rolls 24 are adjustable from their normal position, the control or the regulation can be performed in such a way that initially only one roll 24 is adjusted, and only after evaluation of the desired result, one or more additional rolls 24 are adjusted. Such operation makes it unnecessary to adjust any one location of the traction means an excessive amount in order to balance out the tension across the traction means, i.e., by making small adjustments of the traction means at various locations making a large adjustment at a single location is avoided.

Thus, it will be appreciated that the tracking control system of the present invention permits the usage of a single traction means, configured as a belt, which spans the entire width of the bale chamber and prevents smaller crop components, such as leaves and blossoms, from falling out of the baling chamber onto the ground. Further, even if the traction means is configured as a chain, its durability is improved since side forces no longer occur which could deform the joints and chain links.

I claim:

1. In a round baler having a baling chamber formed in part by a traction means located between opposite side walls of the baler and being supported on a plurality of rolls arranged for dividing the traction means into various spans for conveying crop and rolling the crop upon itself to form a bale, said plurality of rolls including at least one roll having one end supported from one of the opposite side walls for radial adjustment relative to a longitudinal axis of the support roll, the improvement comprising: a lever having opposite first and second ends and being pivotally connected, at a location between said first and second ends, with said one of the opposite side walls; said first end of the lever being coupled to said one end of said at least one roll; tracking control means including tracking sensing means for sensing a condition of the traction means indicative of sideways or impending sideways movement of the traction means relative to a normal straight running position of the traction means and for generating a signal indicative of such condition; and an actuator means including a powered actuator pivotally mounted to said one of the opposite side walls, having a linearly adjustable rod coupled to said second end of the lever and being coupled to said sensing means for receiving said signal and being responsive to said signal for effecting linear movement of said rod and thereby adjusting said one end of said at least one roll radially in a direction and by an amount for causing the traction means to return to or remain in its straight running position.

2. The round baler defined in claim 1 wherein said actuator means includes an electric motor coupled for effecting linear adjustment of said rod.

3. The round baler defined in claim 1 wherein a ball joint is provided for coupling the second end of the lever to the one end of the roll.

* * * * *